June 14, 1932. J. W. DUNCAN 1,862,666
POISON DISTRIBUTING MACHINE
Filed March 30, 1931
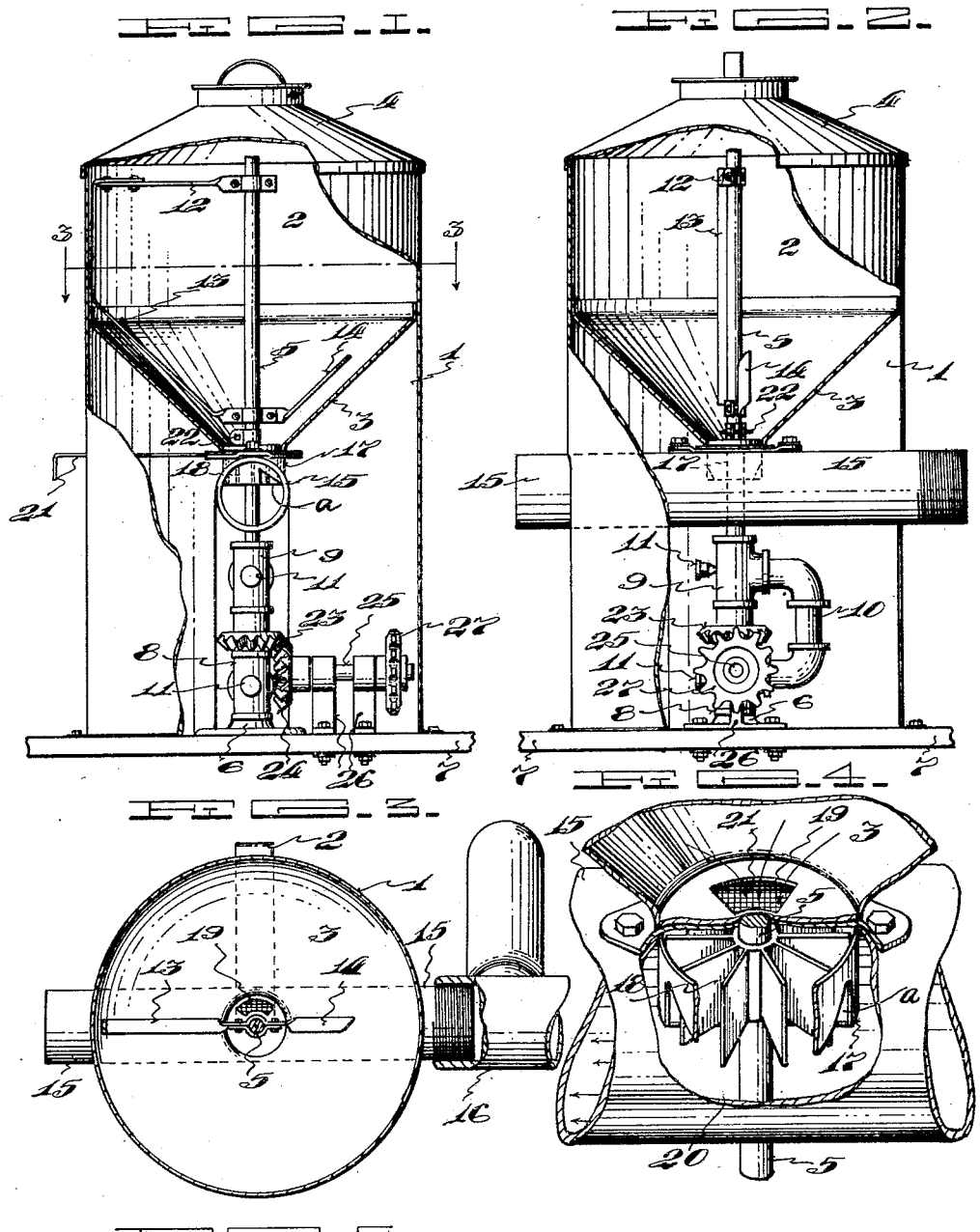
James W. Duncan
INVENTOR.
BY 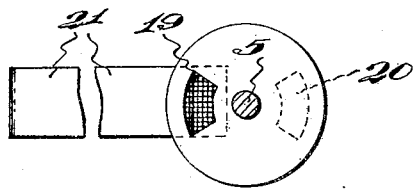
ATTORNEY.

Patented June 14, 1932

1,862,666

UNITED STATES PATENT OFFICE

JAMES W. DUNCAN, OF WICHITA FALLS, TEXAS

POISON DISTRIBUTING MACHINE

Application filed March 30, 1931. Serial No. 526,391.

This invention relates to poison distributing machines and it has particular reference to that type of machine designed to distribute powdered poison, such as sulphur, calcium, arsenic or other standard and accepted kinds of poison and the principal object of the invention resides in the provision of a new and novel combination of elements cooperating to discharge predetermined quantities of powdered poison into an artificial draft for distribution either over a wide area or confined to a few rows of vegetation.

Another object of the invention resides in the provision of means for holding the reserve material out of the influential area of the draft and dispenses only sufficient quantities of powdered poison from the reserve to constitute a suitable or desirable distribution necessary to destroy and hinder the growth of insects infesting the vegetation.

Still another object of the invention resides in the provision of novel means for controlling the dispensation of material by increasing or reducing the port through which the material is passed from the reserve or hopper into the discharge conduit and which means may be operated exteriorly of the machine.

Broadly, the invention comprehends the provision of a machine of the character specified, capable of being mounted upon and to cooperate with any type of wheeled implement and its simplicity of design and consequent economical manufacture places it within the purchasing range of the most modestly situated farmer.

With the foregoing objects as paramount, the invention has particular reference to its salient features of construction and operation of parts to become manifest as the description proceeds, taken in connection with the accompanying drawing, wherein:—

Figure 1 is an elevational view of the machine, with portions broken away to show the interior of the hopper and dispensing mechanism.

Figure 2 is a similar view, taken at a quarter angle on Figure 1.

Figure 3 is a sectional view on line 3—3 of Figure 1.

Figure 4 is a fragmentary view of the hopper and discharge conduit, showing a perspective view of the multi-chambered discharge valve, and Figure 5 is a detail view of the quantity regulating valve.

Continuing more in detail with the invention, 1 designates a cylindrical housing, the upper portion 2 of which has an inclined floor 3 and constitutes a hopper and has a cover 4 which is removable to admit powdered poison.

Extending vertically through the housing 1 and into the hopper 2 is a vertical shaft 5. The shaft rests freely upon a boss 6 mounted upon the floor 7 and is embraced by a collar 8 near its lower end, which collar forms a bearing and immediately above this collar is a similar collar 9, providing another bearing to maintain rigidity of the shaft. The collars 8 and 9 are spaced apart by means of the joint 10, which, with a view of cheapness in construction, is comprised of a pair of elbows and a short section of pipe. Grease cups 11 are provided to supply continuous lubrication to the bearing within the collars 8 and 9.

Mounted upon the upper end of the shaft 5 is an arm 12, the outer end of which terminates short of the inner surface of the hopper 2 and is joined to an upwardly turned arm 13, whose lower end embraces the shaft 5 at the bottom of the hopper 2. A short arm 14 extends a short distance up the inclined floor 3 of the hopper 2 diametrically opposite the arm 13. Rotation of the shaft 5 will obviously rotate the arrangement of arms 12, 13 and 14 and in so doing, the material within the hopper 2 is continuously agitated while the machine is in operation and there is consequently no likelihood that the material will become lumpy and refuse to be discharged from the hopper.

Extending diametrically through the housing 1 immediately below the hopper 2 is a conduit 15 which is threaded on one end, as shown to provide an attachment for a suitable fan, fragmentarily shown in Figure 3 and designated at 16.

This conduit has an opening midway of its ends to receive a cylindrical valve casing 17 and contains the multi-chambered valve 18, so termed for the reason that it is provided with a series of radially directed blades, the chambers therebetween coming into successive register with a screened aperture 19 at the top of the housing 17 and an open aperture 20 at the bottom of the housing 17, diametrically opposite the said aperture 19. The aperture 19 may be covered or partially covered by means of a slide 21, as shown in Figures 3, 4 and 5, through which arrangement a quantity of material from the hopper 2 may be increased or diminished at the will of the operator.

In Figures 1 and 2, it will be particularly noted that the material which has passed out of the range of the agitator arms 12, 13 and 14, will be agitated by means of a small pin 22, which lies adjacent the shaft 5 and at right angles with its axis. Inasmuch as the pin or screw 22 is fixed to the shaft 5, it is moved in a rotary manner over the aperture 19 in the top of the valve chamber 17 and thus material is not permitted to accumulate at this point and form a seal but urged through the screen covering the aperture 19 and in being thus screened, it is not possible for any foreign objects to fall into the range of the rotary valve 18 and injure the same.

In order to impart rotation to the vertical shaft 5, to operate the several elements named, a beveled gear 23 is mounted thereon and enmeshes a similar gear 24, mounted upon a stub shaft 25, extending at right angles relative to the axis of shaft 5 and is supported by standards 26.

A sprocket wheel 27 is carried upon the outer end of the stub shaft 25 and is convenient for the reception of a suitable driving chain, not shown, which may extend to any operating part of the machine upon which the invention is mounted for operation. Since the chain nor the driving mechanism is a part of the present invention, and in view of the conventional nature thereof, it is not considered necessary to illustrate the same.

In operation, material within the hopper 2, being agitated by the arms 12, 13 and 14 and by the short screw or pin 22, is urged through the screened aperture 19, to fall within one of the several chambers provided between the spaced blades of the valve 18 and as the valve moves in a rotary manner within the chamber 17, the material drops through the aperture 20 into the discharge conduit 15, through which there is a constant draft of air. In disposing the apertures 19 and 20 diametrically opposite in the housing 17, the continuous feed of the material into the said housing 17 is not interfered with by the continuous blast of air through the conduit 15, it being obvious that unless this provision was made, air would hinder free passage of the material from the hopper 2 into the valve chamber 17. However, with the arrangement shown, no difficulty is had in providing a continuous flow of material into the discharge conduit 15.

It is understood that very desirable results may be had either by providing an adjustable spout on the end of the conduit 15 opposite the fan 16 or by connecting a series of flexible tubes to the discharge end of the conduit 15 and directing their ends downward toward the rows of vegetation over which the machine is moved.

It is pointed out that the valve housing 17 is cut away at $a$, providing a larger discharge aperture 20 than the inlet aperture 19 at the top of the housing 17 and diametrically opposite. This cut away portion allows the air passing through the discharge conduit 15 to have free access to the material moved by the rotary valve 18 into register with the discharge aperture 20 and is a desideratum for complete discharge of the material moved by the rotating valve. By providing this cut away portion adjacent the discharge aperture 20, the possibility of clogging is completely removed, thereby gaining the full effects of the operation of the valve.

Manifestly, the construction shown is capable of considerable modification and such modification as is considered within the scope and meaning of the appended claims is also considered within the spirit and intent of the invention.

What is claimed is:

1. A poison distributing machine including a hopper and a vertical shaft therein provided with agitating elements, an encased, multi-chambered valve also carried by said shaft and communicating with a discharge conduit and means for urging material from said hopper to be successively received in the chambers of said valve and moved to a position for discharge into said conduit.

2. A poison distributing machine including a hopper and a vertical shaft carrying an agitating element, a rotary valve also carried by said shaft at the outlet end of said hopper, a casing for said valve having diametrically disposed apertures, a discharge conduit for receiving material from one of said apertures and means for rotating said shaft to rotate said valve, whereby material received in said valve casing through one of said apertures will be moved for discharge through the other of said apertures to be received by said conduit.

3. An insect exterminating machine including a hopper having agitating means therein, a rotary shaft, a valve carried by said shaft provided with a series of radially spaced blades, a casing for said valve having diametrically opposed apertures, a discharge conduit below said casing and means for rotating said shaft whereby material in said hopper will enter one of said apertures and be rotated into register with the other of said apertures, to be received in said discharge conduit.

4. In an insect exterminating machine, a powder hopper and a discharge valve therefor having a series of radially spaced blades, a casing for said valve having diametrically opposed openings, one of which communicates with said hopper and the other affording an outlet for said valve casing and means for imparting rotation to said valve to convey material received through said inlet to said outlet for discharge.

In testimony whereof I affix my signature.

JAMES W. DUNCAN.